(12) United States Patent
Benton (10) Patent No.: US 8,342,594 B2
(45) Date of Patent: Jan. 1, 2013

(54) APPARATUS FOR REDUCING DRAG ON A VEHICLE

(76) Inventor: Craig R. Benton, Phoenix, AZ (US)

( * ) Notice: Subject to any disclaimer, the term of this patent is extended or adjusted under 35 U.S.C. 154(b) by 0 days.

(21) Appl. No.: 13/411,210

(22) Filed: Mar. 2, 2012

(65) Prior Publication Data

US 2012/0223544 A1 Sep. 6, 2012

Related U.S. Application Data (63) Continuation-in-part of application No. 12/969,456, filed on Dec. 15, 2010, which is a continuation-in-part of application No. 11/653,536, filed on Jan. 16, 2007, now Pat. No. 7,862,102.

(60) Provisional application No. 61/374,418, filed on Aug. 17, 2010.

(51) Int. Cl.
*B62D 35/00* (2006.01)
(52) U.S. Cl. .................................................. 296/180.1
(58) Field of Classification Search .... 296/180.1–180.5; 180/903
See application file for complete search history.

(56) References Cited

U.S. PATENT DOCUMENTS

| | | | |
|---|---|---|---|
| 1,714,609 A | 5/1929 | Massey | |
| 1,913,169 A | 6/1933 | Martin | |
| 2,938,680 A | 5/1960 | Greene et al. | |
| 3,178,131 A | 4/1965 | Laing | |
| 3,455,594 A | 7/1969 | Hall et al. | |
| 3,791,468 A | 2/1974 | Bryan, Jr. | |
| 3,951,445 A | 4/1976 | Tatom | |
| 3,960,402 A | 6/1976 | Keck | |
| 3,999,797 A | 12/1976 | Kirsch et al. | |
| 4,320,920 A | 3/1982 | Goudey | |
| 4,379,582 A | 4/1983 | Miwa | |
| 4,451,074 A * | 5/1984 | Scanlon | 296/180.4 |
| 4,458,937 A | 7/1984 | Beckmann et al. | |
| 4,462,628 A | 7/1984 | Gregg | |
| 4,810,022 A | 3/1989 | Takagi et al. | |
| 4,818,015 A * | 4/1989 | Scanlon | 296/180.1 |
| 4,976,349 A | 12/1990 | Adkins | |
| 5,199,762 A | 4/1993 | Scheele et al. | |
| 5,280,990 A | 1/1994 | Rinard | |
| 6,045,095 A | 4/2000 | Parrish, IV | |
| 6,846,035 B2 * | 1/2005 | Wong et al. | 296/180.1 |
| 7,192,077 B1 | 3/2007 | Hilleman | |
| 7,374,229 B1 * | 5/2008 | Noll et al. | 296/180.2 |

(Continued)

FOREIGN PATENT DOCUMENTS

FR 2624823 A1 * 6/1989

(Continued)

*Primary Examiner* — H. Gutman
(74) *Attorney, Agent, or Firm* — Arent Fox LLP (57) ABSTRACT

An apparatus for reducing atmospheric drag on a vehicle. The apparatus includes an airfoil having a receiving feature, wherein the airfoil is attachable with a back portion of the vehicle. The apparatus includes at least one extender attachable with the back portion of the vehicle, and a slide arm attached to the at least one extender and mateable with the recess portion of the airfoil. The apparatus is configured such that when the slide arm is disposed in the receiving portion of the airfoil, the airfoil is in an extended position relative to the back of the vehicle. The apparatus is further configured such that applying a force on the airfoil in a direction substantially perpendicular to the back portion of the vehicle buckles the airfoil, thereby lifting the slide arm from the recess and moving the airfoil to a retracted position.

21 Claims, 10 Drawing Sheets

U.S. PATENT DOCUMENTS

| | | |
|---|---|---|
| 7,484,791 B1 | 2/2009 | Chen |
| 7,641,262 B2 * | 1/2010 | Nusbaum ................... 296/180.5 |
| 8,075,046 B2 * | 12/2011 | Pursley ..................... 296/180.2 |
| 2004/0256885 A1 | 12/2004 | Bui |
| 2007/0228772 A1 | 10/2007 | Froeschle et al. |
| 2007/0236044 A1 * | 10/2007 | Froeschle et al. .......... 296/180.5 |

FOREIGN PATENT DOCUMENTS

| | | | |
|---|---|---|---|
| JP | 63195070 A | * | 8/1988 |
| WO | WO 92/19485 | | 11/1992 |

* cited by examiner

APPARATUS FOR REDUCING DRAG ON A VEHICLE

This application is a continuation-in-part of U.S. patent application Ser. No. 12/969,456, filed on Dec. 15, 2010, and titled "Apparatus for Reducing Drag on a Vehicle" (the '456 application), which claims priority to U.S. Provisional Patent Application No. 61/374,418, filed Aug. 17, 2010, titled "Apparatus for Reducing Drag on a Vehicle," and the '456 application is a continuation-in-part of U.S. patent application Ser. No. 11/653,536, filed Jan. 16, 2007, titled "Apparatus for Reducing Drag on Vehicles," now U.S. Pat. No. 7,862,102. The disclosures of the above-recited prior applications are each hereby incorporated herein by reference in their entirety.

BACKGROUND OF THE INVENTION

1. Field of Invention

Aspects of this invention relate generally to the field of atmospheric drag reduction, and more particularly to an apparatus for reducing drag on vehicles.

2. Background of the Invention

When a vehicle is in motion, a low pressure area generally forms at the rear of the vehicle, and the low pressure area may result in increased drag. The increased drag can increase resistance to the motion of the vehicle and force the engine of the vehicle to work harder, and as a result reduce mileage, among other things. The increased drag is often aggravated by the shape of the vehicle. For example, the square-shaped rear end of a semi-tractor trailer may cause far more drag than the round-shaped end of a sports car.

There have been a number of drag reducing devices described in the related art. For example, U.S. Pat. No. 5,280,990 to Rinard ("Vehicle Drag Reduction System," issued on Jan. 25, 1994) describes fixed-position mounted vanes to direct air to the rear of a semi-tractor trailer. Similar devices are found in U.S. Pat. No. 3,999,797 to Kirsch et al. ("Airvane Device for Bluff Vehicles and the Like," issued on Dec. 28, 1976) and U.S. Pat. No. 3,960,402 to Keck ("Vehicle Flow Direction Vanes," issued on Jun. 1, 1976).

U.S. Patent Application Publication No. US2004/0256885 to Bui ("Rear Spoiler With Motorized Vertical and Angle Adjustability," published on Dec. 23, 2004), which provides an adjustable rear spoiler that comprises a wing-like mechanism for trucks, has an electric motor actuator for transmitting rotational motion to a worm gear box assembly, along with a wing unit and wing mounting brackets attached to upper linkage supports to create pivotal angle adjustments.

U.S. Pat. No. 6,045,095 to Parrish, IV ("Vane-Airfoil Combination," issued on Apr. 4, 2000) shows a vane-airfoil combination that comprises a rotating set of vanes located in front of the leading edge of the airfoil assembly. WIPO Application No. W092/19485 to Eliahou ("Vehicle Streamlining Device for Pressure Drag Reduction," published on Nov. 12, 1992) discloses a device for diverting air at the rear of a trailer that comprises a flap for streamlining a vehicle to reduce drag. The flap is raised or lowered by an actuator connected to the vehicle speedometer. U.S. Pat. No. 1,714,609 to Massey ("Airplane," issued on May 25, 1928) shows a dual airfoil for vehicles that comprises a pair of airfoils that provide lift and have forward and rear positions. U.S. Pat. No. 1,913,169 to Martin ("Wing and Like Member for Aircraft," issued on Jun. 6, 1933) provides a combination triple airfoil for vehicles that provide lift and reduce drag and have staggered positions relative to one another.

U.S. Pat. No. 4,810,022 to Takagi et al. ("Automotive Vehicle With Adjustable Aerodynamic Accessory and Control Therefor," issued on Mar. 7, 1989) discloses an adjustable aerodynamic spoiler with a controller that has spoiler settings regulated automatically by sensed driving conditions, such as vehicle speed, crosswinds and the like.

SUMMARY

There remains an unmet need to more effectively reduce the drag caused by the low pressure area that is created behind a moving vehicle. Aspects of the present invention provide an apparatus for reducing drag on vehicles via features that may be mechanically actuated. Another variation in accordance with aspects of the current invention includes a foil disposed in a retracted position that may be deployed into an expanded position. According to various example aspects, the foil may be activated via a series of arms and pivots, and the foil may deploy in several segments from a retracted position to a fully expanded position.

Other aspects and advantages will become apparent in the following description and the features of novelty which illustrate exemplary aspects of this invention will be pointed out with particularity.

BRIEF DESCRIPTION OF THE DRAWINGS

Various example aspects of the systems and methods in accordance with aspects of this invention will be described in detail, with reference to the following figures, wherein.

DETAILED DESCRIPTION

Various features and advantages in accordance with aspects of this invention are described in, or will be apparent from, the following detailed description of various example implementations.

Figure 1A:
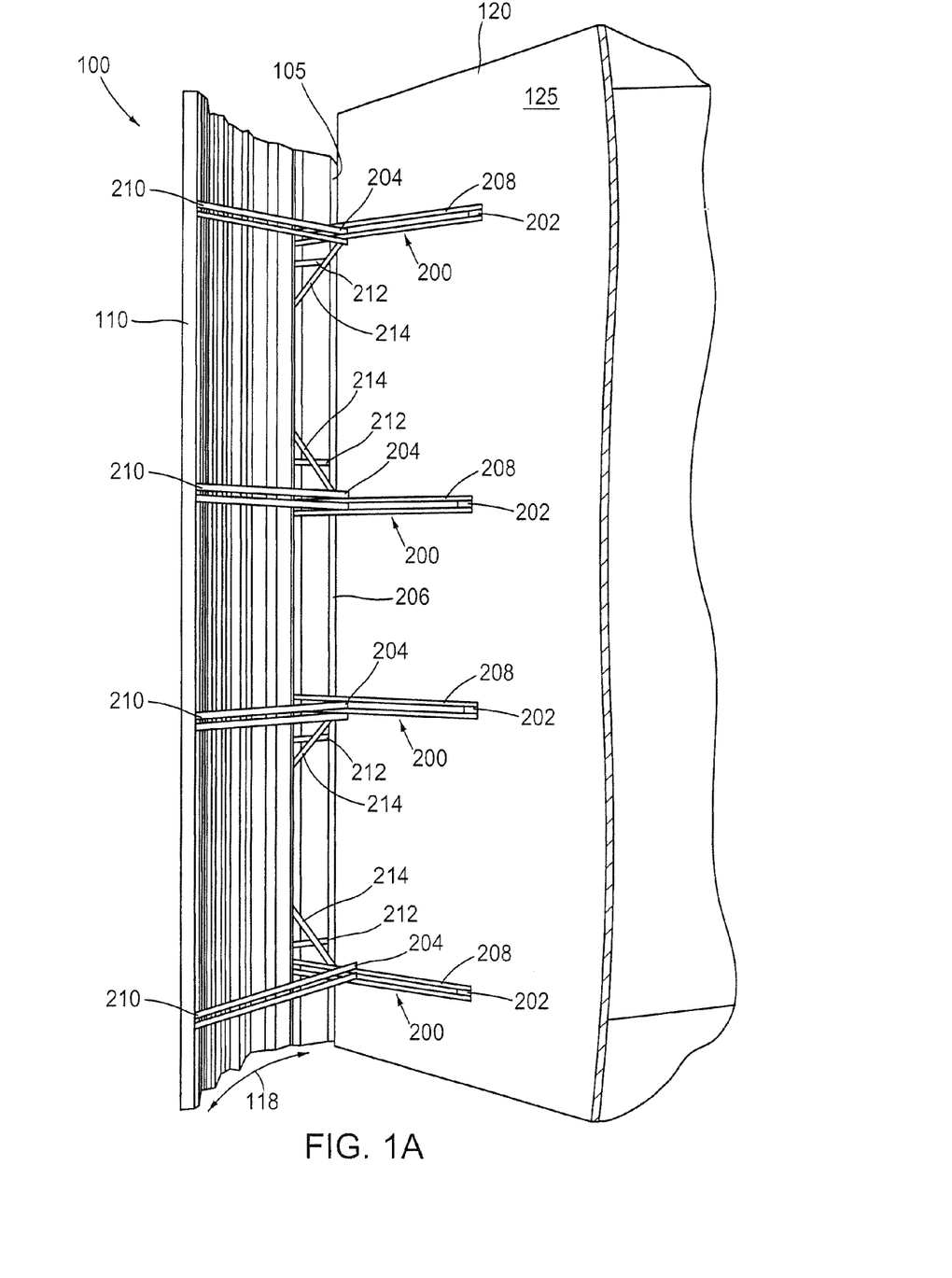
FIG. 1A is a perspective view of an apparatus for drag reduction in an expanded position, according to various aspects of the present invention.
Figure 1B:
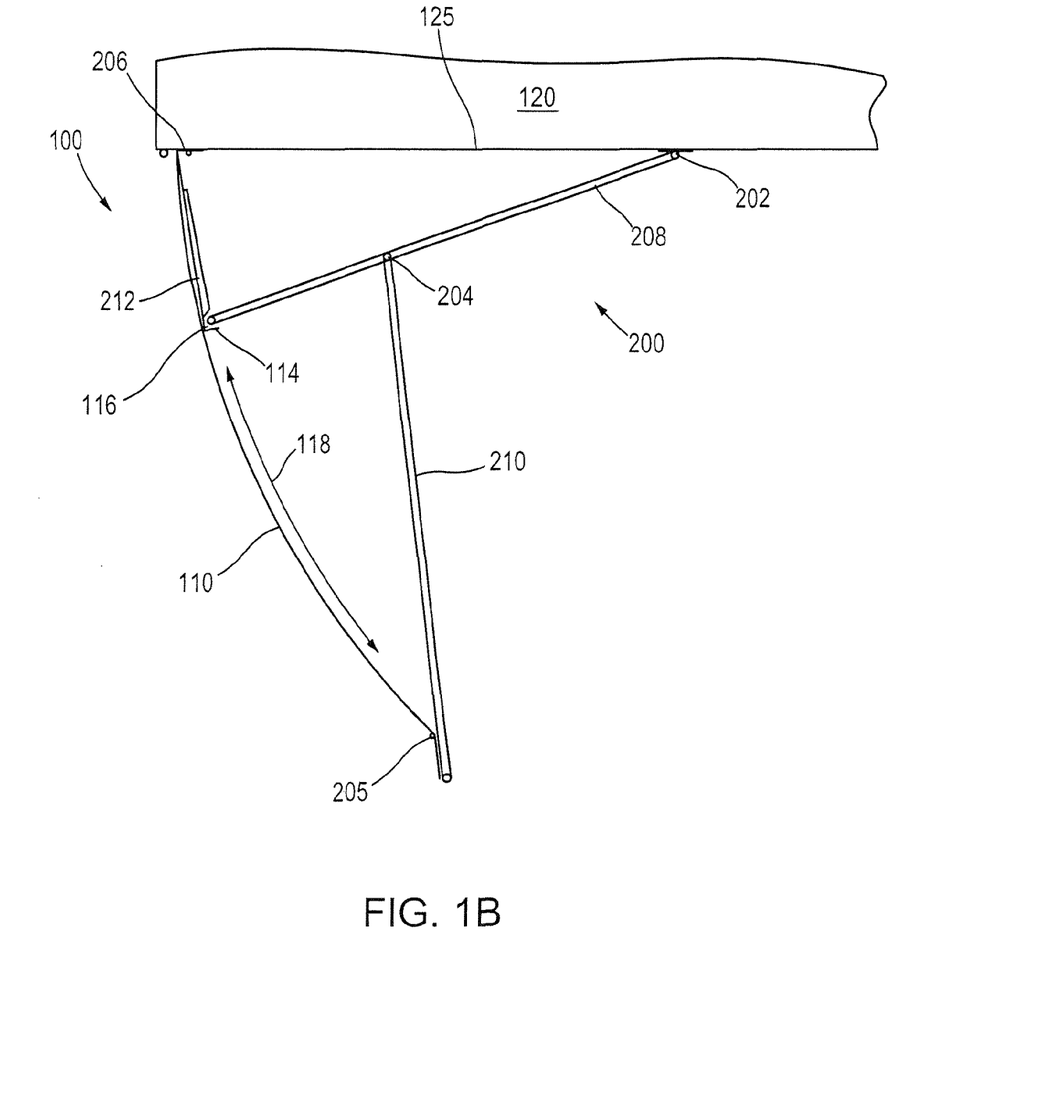
FIG. 1B is a top view of the apparatus of FIG. 1A in an expanded position.

FIGS. 1A-2B are perspective and top views, respectively, of an apparatus for drag reduction 100, according to various aspects of the present invention, shown in an expanded position and a retracted positions. In FIGS. 1A and 1B, a sectioned thin profile wind diverting material 110 (each wind diverting material also interchangeably referred to herein as a "airfoil") is shown as fully expanded. The foil may comprise a single sheet of material or may be formed by a series of segments that are deployed as a result of the expansion of the foil 110. A more detailed description of an example structure of the segmented foil 110 is given in applicant's co-pending U.S. patent application Ser. No. 12/969,456, which is incorporated by reference herein. In the expanded position, the advantageous drag reducing position is a position somewhat angled or curved in an inward curve relative to the surface of the back portion 125 of the vehicle 120, so as to follow generally the fluid flow of air past the rear of the vehicle 120. However, according to various aspects of the current invention, other advantageous drag reducing positions may be determined.

Figure 2A:
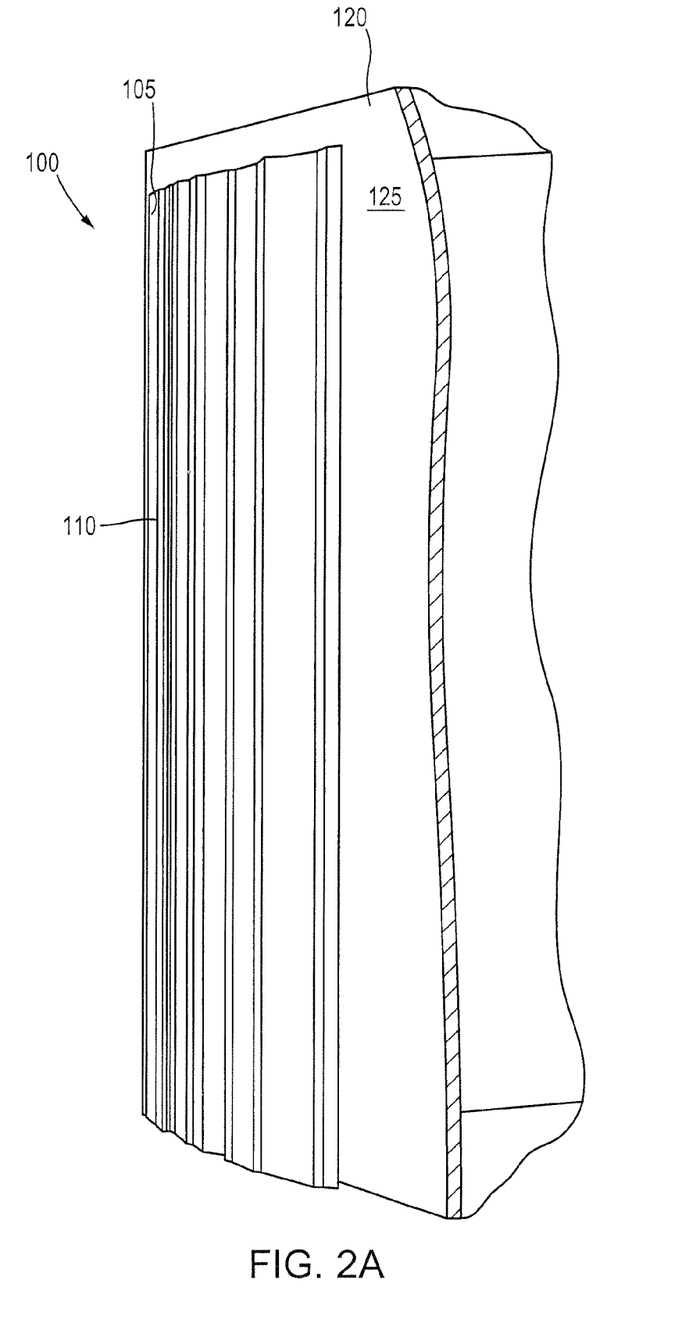
FIG. 2A is perspective views of the apparatus of FIG. 1A in a retracted position.
Figure 2B:
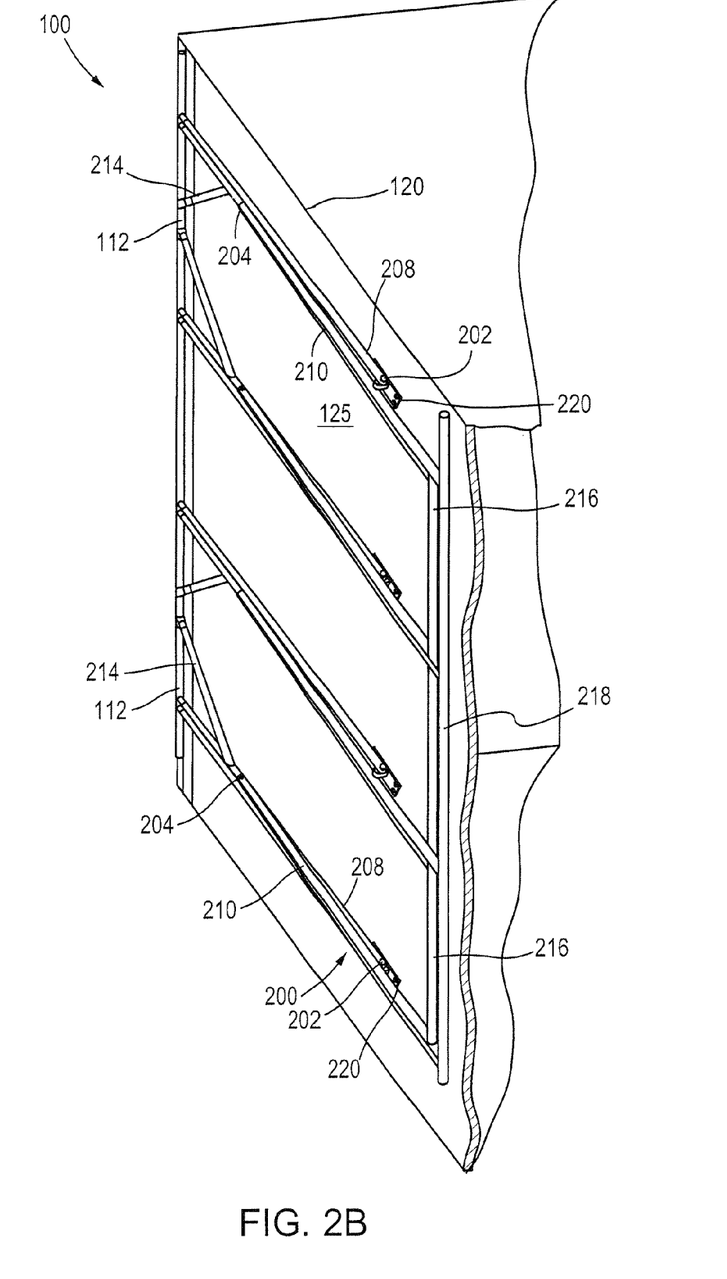
FIG. 2B is a partial perspective view of the apparatus of FIG. 1A in a retracted position, with partial omission.

FIG. 2A shows a perspective view of the apparatus for drag reduction 100, where the airfoil 110 is held in a retracted position. FIG. 2B shows a partial perspective view the apparatus for drag reduction 100, in a retracted position, with the airfoil 110 omitted. According to various aspects, the airfoil 110 may held in the retracted position under the pressure of one or more biasing features, such as springs, or torsion pins that bias arms towards a retracted position. A portion 105 of the sectioned airfoil 110 may be pivotally fixed to a portion of a vehicle 120, such as the rear portion 125, in order to fix the airfoil 110 to the vehicle 120. It should be noted that the sectioned airfoil 110 may be held in the retracted position via a tension built into the device or with a latching feature, for example, as described below in more detail.

In addition to the airfoil 110, the drag reduction device 100 includes a series of arms, pivots, and stops, which allow the airfoil 110 to fully open and remain locked in an opened position until a closing force is provided. The drag reduction device includes a plurality of extenders 200. Each of the extenders 200 includes a plurality of elements that allow the airfoil to pivot away from the surface of the back portion 125 of the vehicle 120. The extending and locking devices also allow the airfoil to extend in a curved direction, forming an arcuately cross-sectional shaped portion 118. Each of the extenders 200 may include a first pivot 202, a second pivot 204, a third pivot 206, a first arm 208, a second arm 210, a slide ramp arm 212, and a support arm 214. The airfoil 110 may include a fourth pivot 205. When multiple extenders 200 are present, a stabilizing arm 216 may be used to connect each of the second arms 210 together so that the second arms 210 move together. The drag reduction device 100 may further include a slide arm 112 and a stop 114. A first end of the first arm 208 may be pivotally connected to a surface of the back portion 125 of the vehicle 120 via a bracket 220. The pivot provides rotation about an axis relative to the vehicle 120. A second end of the first arm 208 may be connected to the slide arm 112. As each of the first arms 208 may be connected to the slide arm 112, the slide arm 112 may comprise a single elongated arm extending along the height of the airfoil 110. The slide arm 112 may not be secured at any other point along its length, aside from being connected to the first arms 208, and therefore, the slide arm 112 may not restrict movement of the first arm 208. In accordance with another aspect of the present invention, the slide arm 112 may be slideably attached to airfoil 110 and/or slide ramp arm 212 and/or stop 114 as part of the slide motion and to support first arms 208. Because the first arms 208 are secured to the back portion 125 of the vehicle 120 in a pivoting manner at first ends, while the second ends are connected to a freely moveable slide arm 112, the first arms 208 are free to pivot about pivot 202 when a rotational force is applied to the slide arm 112. As shown in FIG. 1A and FIGS. 3-5, each of the first arms 208 and the second arms 210 may include two arms to coupled together via pins, so as to accommodate motion about first and second pivots 202, 204. Additionally, the first arms 208 may be secured to the back portion 125 of the vehicle 120 so that the first arms 208 are biased to the non-pivoted/retracted position.

A first end of each second arm 210 may be joined to a first arm 208 such that the second pivot 204 is located at the point where the arms 208, 210 join. A second end of each second arm 210 may be connected to a second end of the airfoil 110, located opposite the portion of the airfoil 110 that is pivotally secured to the back portion 125 of the vehicle 120. Each second arm 210 may be connected to the airfoil 110 via a connecting arm 218. The connection between the first arm 208 and the second arm 210 is located at the second pivot 204, while the connection between the airfoil 110 and the back portion 125 of the vehicle 120 is located at the third pivot 206. The airfoil may include a fourth pivot 205 located at a point where the airfoil 110 meets the arms 210. This arrangement allows each second arm 210 to pivot about the pivot 204, and the airfoil 110 to pivot about the pivots 205, 206 when a force is applied to the airfoil in a direction about a vertical axis relative to the vehicle 120. The second and third pivots 204, 206 are configured to allow rotation about a vertical axis, but not about a horizontal axis, relative to the vehicle 120.

Figure 4:
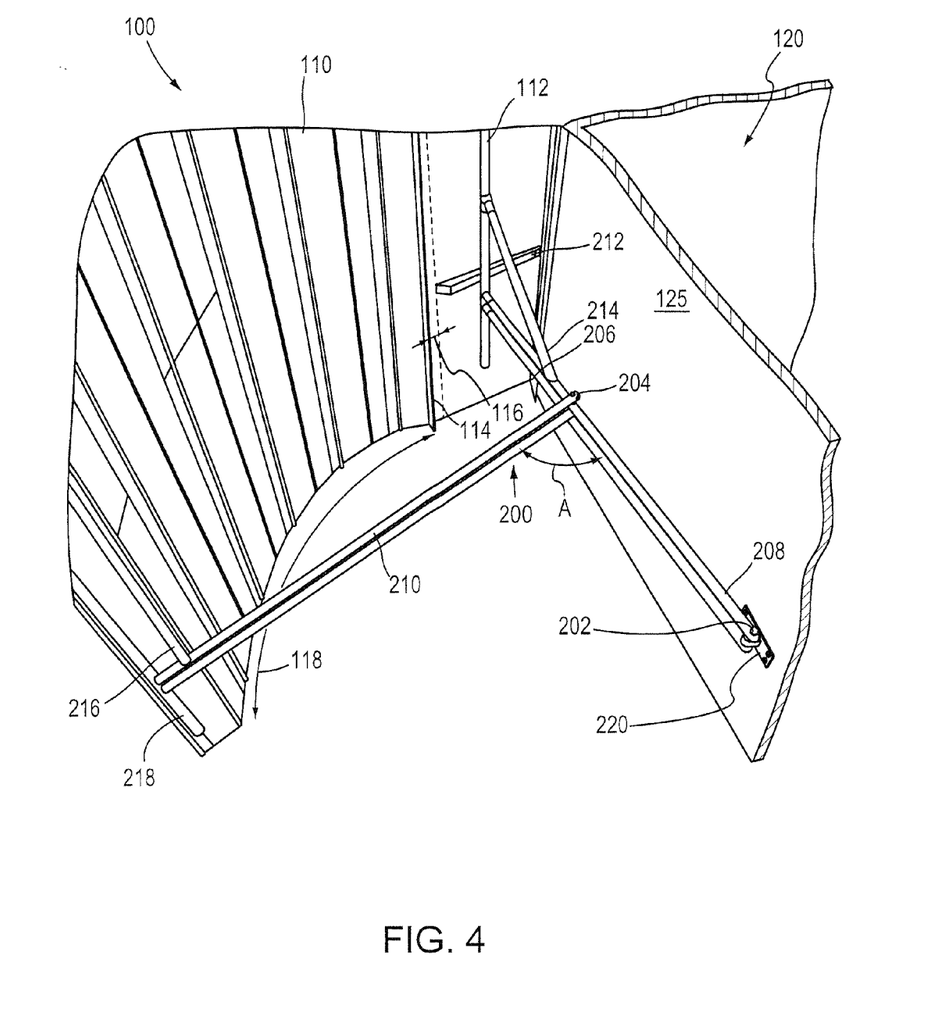
FIG. 4 is a perspective view the apparatus of FIG. 3 in a further expanded position, with partial omission.

The support arm 214 may be connected at one end to the first arm 208, while a second end of the support arm 214 may be connected to the slide arm 112. The support arm 214, when connected in this way, provides stability between the first arm 208 and the slide arm 112 and may provide an addition gripping point for an operator. The slide arm 112 may be freely supported by the first arm 208 and the support 214, such that the slide arm 112 can slide in a direction substantially perpendicular to the back portion 125 of the vehicle 120. Because the first arm 208 is attached to the slide arm 112 and is pivotable about pivot 202, when a force is applied to pivot the first arm 208, the freely supported slide arm 112 correspondingly will move toward or away from the back portion 125 of the vehicle 120. As shown in FIG. 4, which is discussed in more detail below, in one position the slide arm 112 abuts of the ramp arm 212 and is free to slide along the ramp arm 212 when the first arms 208 are pivoted. The ramp arm 212 increases in thickness along its length, thereby providing a ramp shape. The stop 114 may protrude substantially perpendicular from the planer surface direction of the airfoil 110 and be spaced at distance away from the ramp arm 212. The distance between the stop 114 and the ramp arm 212 may be about equal to the thickness of the slide arm 112, thereby forming a receiving feature 116. As is discussed in more detail below, the slide arm 112 may be slid along the entire length of the ramp arm 212, until the slide arm rests within the receiving feature 116 and abuts the stop 114.

A shown in FIG. 1A, the drag reduction device 100 may include a plurality of extenders 200. Each of the extenders 200 may include one or more first arms 208, second arms 210, support arms 214, first pivot 202s, and second pivots 206. Each of the extenders 200 may likewise include one or more corresponding brackets 220 and corresponding ramp arms 212. However, as shown in FIG. 1A, in one example implementation, each of the extenders 200 may connect to a common slide arm 112. This arrangement may provide sufficient stability to control the extension and retraction of the airfoil, while ensuring the airfoil is maintained in position.

Figure 3:
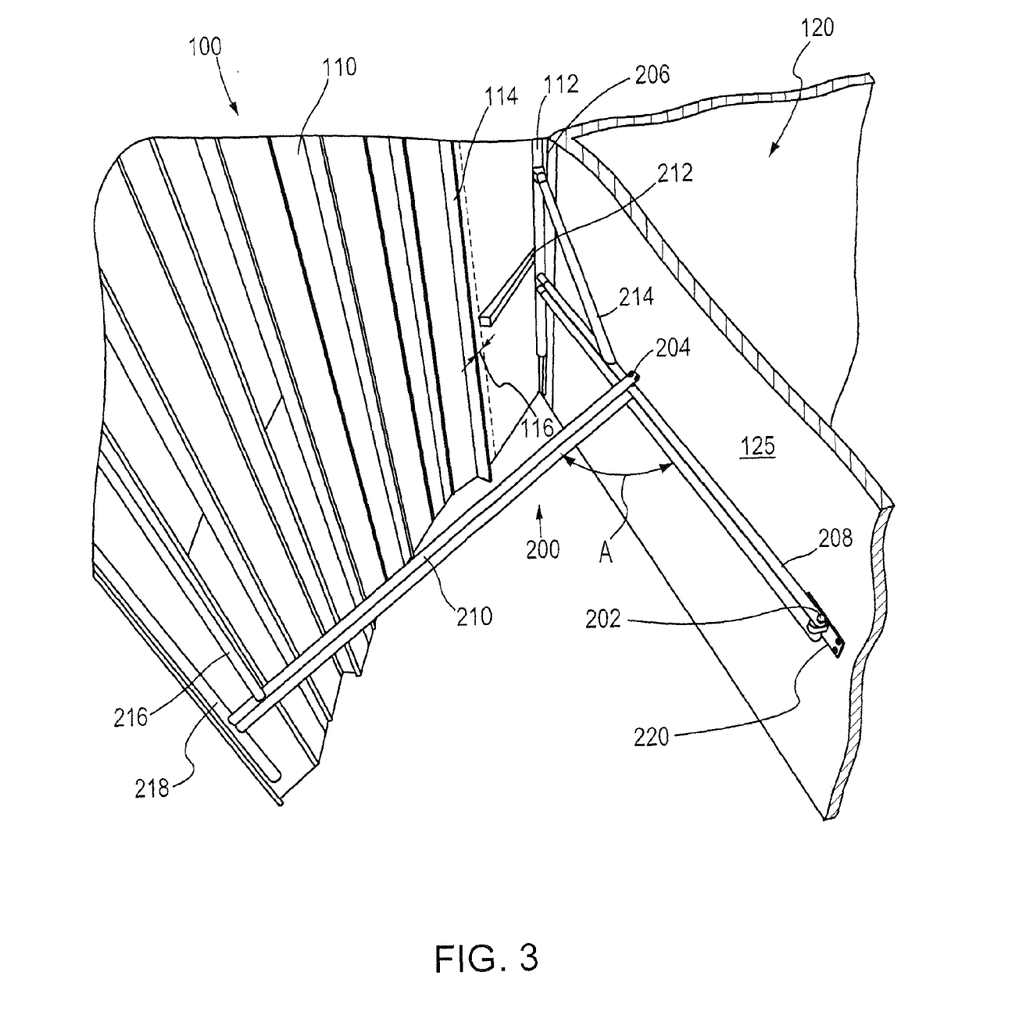
FIG. 3 is perspective view of the apparatus of FIG. 1A in a partially expanded position, with partial omission.

Example operation of the drag reduction device 100 will now be described, starting from the closed position shown in FIGS. 2A and 2B. As shown in FIG. 2A, in the closed position, the airfoil 110 may be positioned against, and extend parallel to, the length of the back portion 125 of the vehicle 120. FIG. 2B shows the same position as FIG. 2A, with the airfoil 110 omitted in order to reveal the underlying structure. As shown in FIG. 2B, in the closed position the first arms 208 and the second arms 210 are substantially parallel to each other and parallel to the back portion 125 of the vehicle 120. Furthermore, in this example implementation, the slide arm 112 is positioned at the pivot 206, so as to nearly contact the back portion 125 of the vehicle 120 and abutting the thinner end of the ramp arm 212 (FIG. 3). To begin extending the airfoil 110, a force may be applied to the end of the airfoil 110 that is opposite the pivot 206, for example. The force may be applied to allow the airfoil 110 to begin to pivot about pivot 206.

FIG. 3 shows a partially extended position where the airfoil 110 has been fully lifted away from the back portion 125 of the vehicle 120. Because an end of the airfoil 110 is connected to an end of the second arm 210, the movement of the airfoil 110 about pivots 206 causes second arms 210 to pivot about pivots 204. As the airfoil 110 continues to pivot about pivot 206, the second arms 210 continue to pivot about pivot 204 along direction A. This motion continues until the position shown in FIG. 3, where the second arm 210 has been pivoted about pivot 204 until the point where the second arm 210 reached a maximum pivot point along direction A. The connection between the first arms 208 and the second arms 210 may be configured so that once the second arm 210 is in the maximum pivot position relative to the first arms 208, the second arms 210 can no longer pivot about pivot 204. Thus, an aspect of the connection point (e.g., a stop) between the first arms 208 and the second point 210 may serve to limit how far the airfoil 110 can be extended from the back portion 125 of the vehicle 120. As shown in FIG. 3, at the point where the second arm 208 is at the maximum pivot point along direction A, the slide arm 112 remains in a similar position to as shown in FIG. 2B. Thus, during the pivoting of the airfoil 110 about pivot 206 and during the pivoting of the second arms 208 about the pivot 204, the first arms 208 remain relatively stationary and do not pivot about pivot 202.

After the airfoil 110 has been extended to the farthest point as limited by second arms 208, a force is then applied to the ends of the first arms 208 that are opposite from the pivot 202 ends of the first arms 208. For example, an operator may grip the support arm 214 and pull the support 214 in a direction away from the back portion 125 of the vehicle 120. As discussed above, in this example implementation, the support arm 214 is connected to the first arms 208 and both the support arm 214 and the first arms 208 are connected to the slide arm 112, while the slide arm 112 is free to move. Thus, when the pulling force is applied to the support arm 214, the first arms 208 begin to pivot about pivot 202, moving the slide arm 112 with this motion. As the first arms 208 continue to pivot about pivot 202, the slide arm 112 slides along the ramp arm 212. FIG. 4 shows the position of the drag reduction device 100 where the first arms 208 have been partially pivoted about the pivot 202, and the slide arm 112 is positioned about half way along the length of the ramp arm 212. As shown in FIG. 4, the pivoting of the first arms 208 about pivot 202 also causes the second arms 210 to follow a similar motion, which in turn causes the airfoil 110 to move along with the second arms 208. As shown in FIG. 4, this arrangement and motion begins to give the airfoil 110 an arcuate cross-sectional shape 118.

Figure 5:
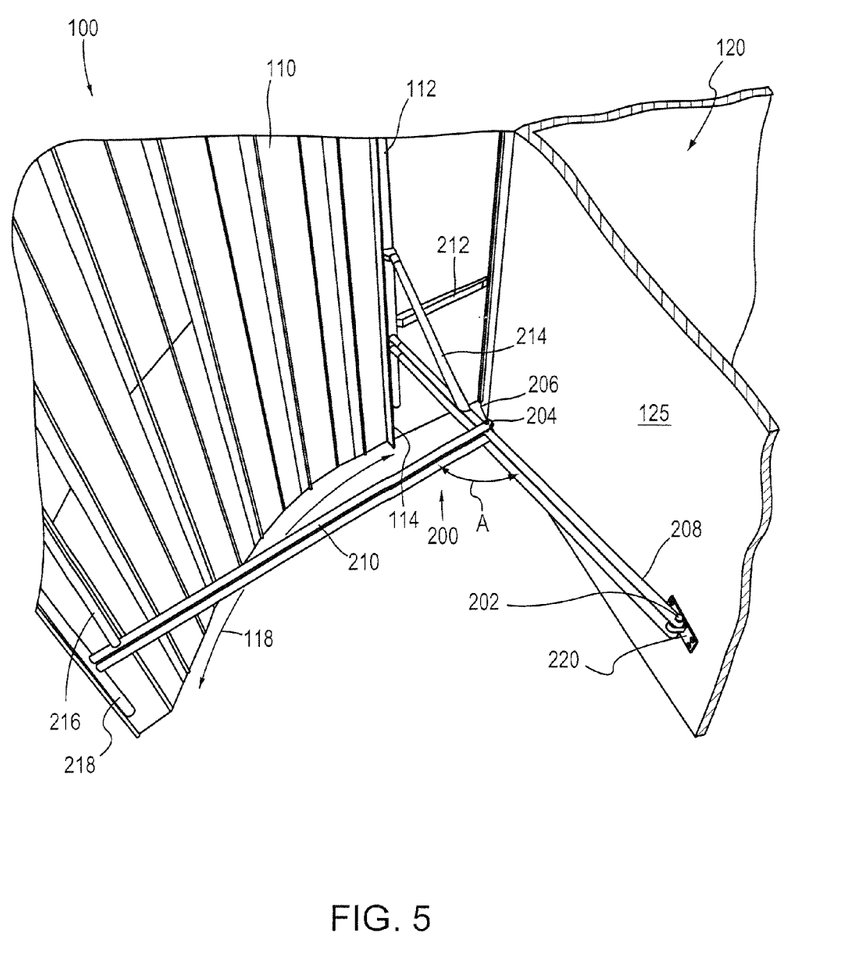
FIG. 5 is a perspective view of the apparatus of FIG. 4 in fully expanded position, with partial omission.

As additional force is applied so as to continue to pivot the first arms 208, the slide arm 112 will eventually travel to the thickest portion of the ramp arm 212. Then, as shown in FIG. 5, once the slide arm 112 passes beyond the end of the ramp 212, the slide arm 212 enters into the receiving feature 116. As discussed above, the receiving feature 116 may include a space or recess formed between the stop 114 and the ramp arm 212, for example. Once the slide arm 112 is positioned within the receiving feature 116, the stop 114 prevents further motion of the slide arm 112. Thus, any additional pivoting of the first arm 208 will be prevented, and likewise, the airfoil 110 cannot be further extended. Additionally, because the slide arm 112 thereby also abuts the end of the ramp arm 212, the first arm may also be prevented from being pivoted in the reverse direction toward a retracted position. Thus, in the position shown in FIG. 5, the components are locked from further pivoting and the airfoil remains in a locked position, being fully extended and having an arcuate cross-sectional shape.

Once locked, the operator of the vehicle is free to drive with the airfoil fully extended without risk of the airfoil closing. The locked arrangement, along with the arcuate cross-sectional shape 118 of the airfoil, prevents wind forces from inadvertently closing the airfoil, as air flow that occurs during driving will be directed so as to impart pivoting forces about pivot 202.

Unlocking the drag reduction device 100 from the locked position requires imparting force such that the slide arm 112 exits the receiving feature 116. For example, when a force is applied to the end of the airfoil 110 that connects to the second arms 210 in a direction substantially perpendicular to the back portion 125 of the vehicle 120, the applied force causes the airfoil 110 to buckle outwardly. The buckling of the airfoil 110 allows the slide arm 112 to lift out of the receiving feature 116. Once the slide arm 112 has been lifted from the receiving feature, the locking forces are no longer in place, and the above-described opening steps can be performed in reverse to return the airfoil 110 to the retracted position. In one aspect of the present invention, the drag reduction device 100 is biased to return to the closed position as soon as the locking forces are removed. For example, the first arms 208 may be pretensioned so that the first arms 208 are biased to pivot about pivot point 202 towards the back portion 125 of the vehicle 120. Furthermore, the above-described biasing features may be implemented to provide additional biasing force to ensure the drag reduction device 100 remains closed until intentionally re-opened by an operator.

One advantage of the bias and locking design is that an operator of the vehicle can close the drag reduction device 100 without exiting the vehicle. The operator may back the vehicle up slowly until the end of the airfoil 110 that connects to the second arm 210 contacts a wall of a building or other stable surface. The operator may continue to back up the vehicle so as to provide a force imparted by the stable surface in a direction substantially perpendicular to the back portion of the truck. This causes the above-described buckling of the airfoil to occur, which then completely closes due to the pretension or biasing forces.

Figure 6:
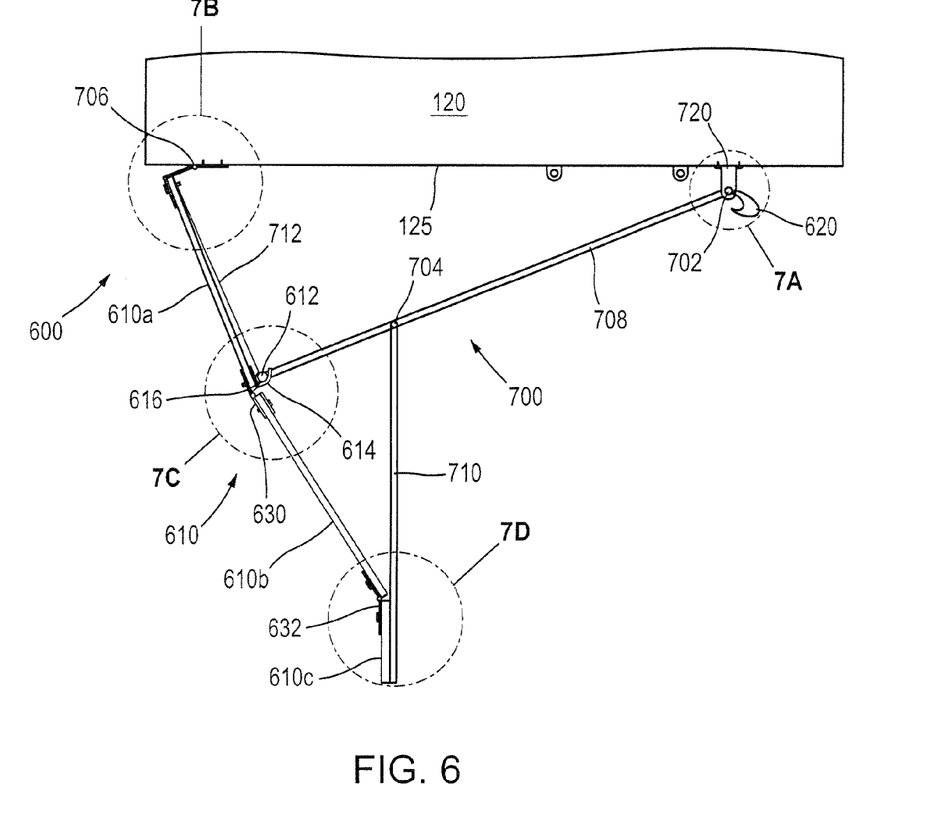
FIG. 6 is a top view of an apparatus for drag reduction in accordance with another aspect of the present invention, in an expanded position.

FIG. 6 shows a top view of a drag reduction device 600 in accordance with another aspect of the present invention. Aspects of the drag reduction apparatus 600 that are similar to aspects of the drag reduction apparatus shown in FIGS. 1-5 are shown similar reference numbers. Drag reduction device 600 may include an airfoil 610 having a plurality of segments 610a, 610b, 610c and a plurality of hinges 630, 632. Hinge 630 connects first section 610a with pivoting second segment 610b and hinge 632 pivotally connects second segment 610b with third segment 610c. The drag reduction device 600 may include extenders 700, which allow for movement of the airfoil 610 via pivots 702, 704, 706, similarly as shown and discussed above with respect to FIGS. 1-5. The drag reduction device 610 may likewise include a ramp arm 712, a slide arm 612, a stop 614, and a receiving feature 616 to provide for a locking position in a similar manner to that shown and described above. The drag reduction apparatus 600 may further include a latch 620 for securing the drag reduction apparatus 600 in a closed position.

Figure 7A:
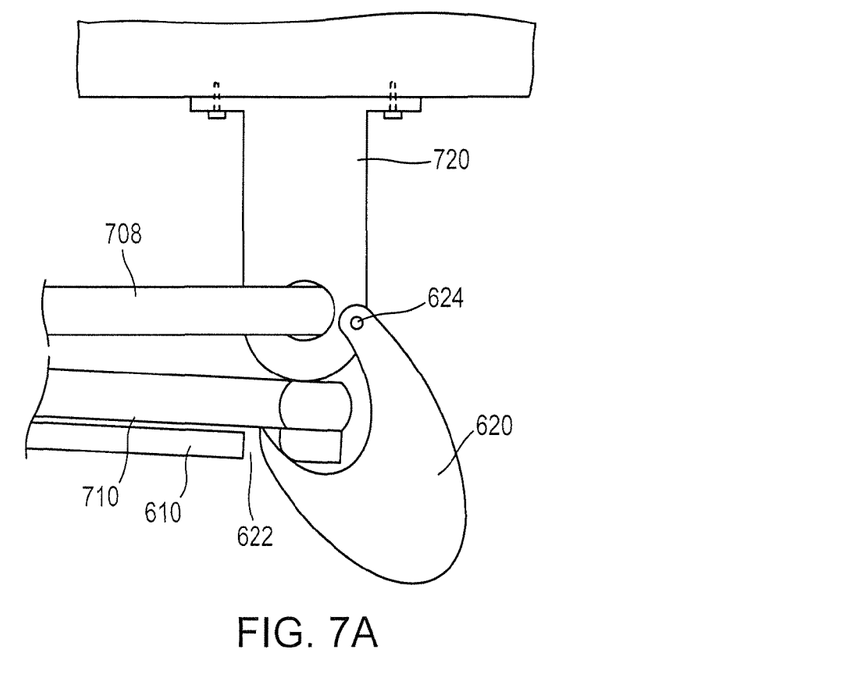
FIG. 7A is a top view of portion A of the apparatus of FIG. 6 in a retraced position.

FIG. 7A to 7D show detailed views of portions 7A-7D of FIG. 6, respectively. FIG. 7A shows operation of the latch 620 when the drag reduction device 600 is in a retracted position. As shown in FIG. 7A, when the first arm 708 and the second arm 710 are substantially parallel to the back portion 125 of the vehicle 120, an end portion of the third segment 610c and an end portion of the second arm 710 may be aligned with a portion of the first arm 708 that is connected to the bracket 720. The third segment 610c may include a groove 622 sized and shaped to receive an end of the latch 620. In the retracted position the second arm 710 may contact the bracket 720, which enables alignment of the groove 622 with the latch 620. The latch 620 may then be pivoted about pivot 624 so that the latch 620 enters the receiving groove 622. Once the latch 620 is disposed in the receiving groove 622, the second arm 710 is unable to move into the expanded position until the latch 620 is pivoted out of the receiving groove 622. While the securing feature is shown in combination with the drag reduction device 600, aspects of the present invention may include similar securing features, and biasing features, for the drag reduction device shown in FIGS. 1-5. Furthermore, aspects of the present invention may include other securing features that serve the similar functions to the latch 620

Figure 7B:
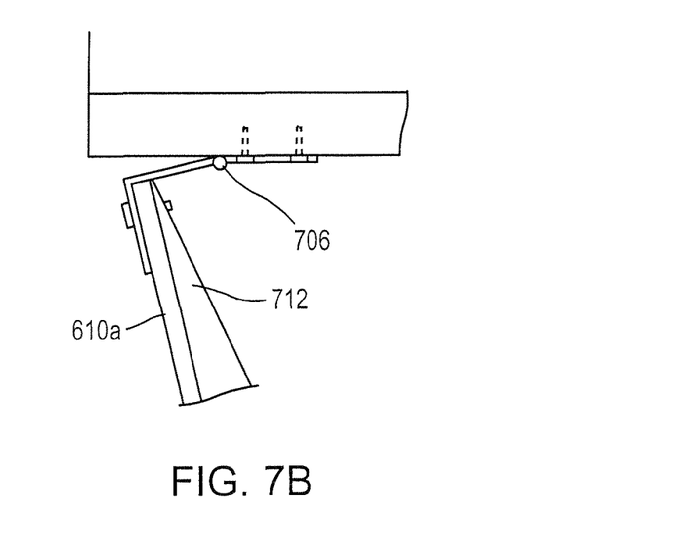
FIG. 7B is a top view of portion B of the apparatus of FIG. 6 in an expanded position.
Figure 7C:
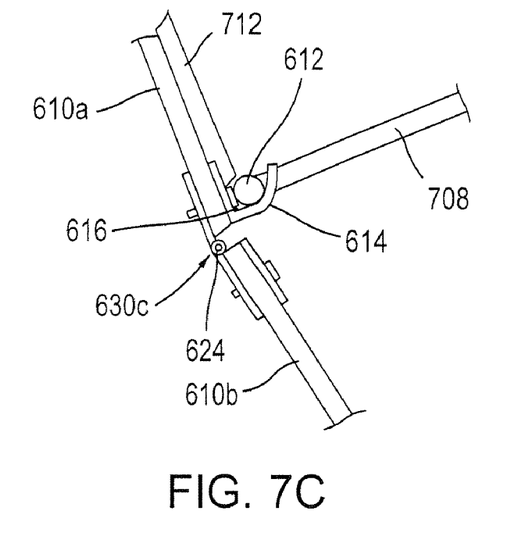
FIG. 7C is a top view of portion C of the apparatus of FIG. 6 in an expanded position.
Figure 7D:
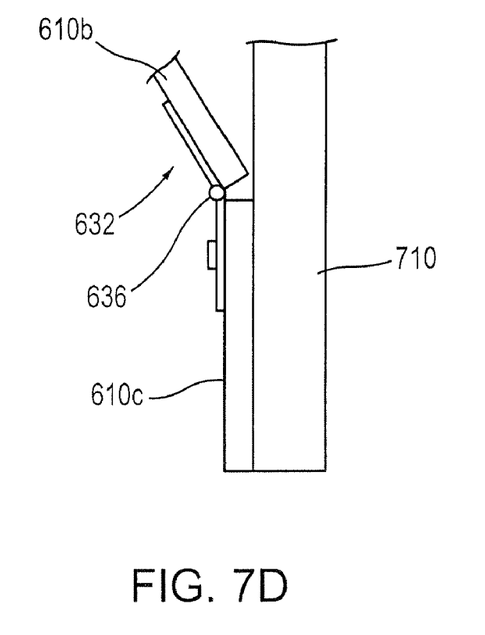
FIG. 7D is a top view of o portion D of the apparatus of FIG. 6 in an expanded position.

FIG. 7B shows details and features of the first segment 610a for pivoting about pivot 706, along the lines described above. FIG. 7C shows that the hinge 630 allows the second segment 610b to pivot about pivot 624 relative to the first segment 610a. FIG. 7D shows that the hinge 632 allows the third segment 610c to pivot about the pivot 636 relative to the second segment 610b.

While aspects of this invention have been described in conjunction with the exemplary variations outlined above, various alternatives, modifications, variations, improvements, and/or substantial equivalents, thereof whether known or that are or may be presently unforeseen, may become apparent to those having at least ordinary skill in the art. Accordingly, the example aspects of the invention, as set forth above, are intended to be illustrative, not limiting. Various changes may be made without departing from the spirit and scope hereof. Therefore, aspects of the invention are intended to embrace all known or later-developed alternatives, modifications, variations, improvements, and/or substantial equivalents.

What is claimed is:

1. An apparatus for reducing atmospheric drag on a vehicle, the apparatus comprising:
   an airfoil having a receiving feature, and the airfoil being attachable with a back portion of the vehicle;
   at least one extender attachable with the back portion of the vehicle; and
   a slide arm attached to the at least one extender and mateable with the receiving feature of the airfoil;
   wherein, when the slide arm is disposed in the receiving feature of the airfoil, the airfoil is configured to be in an expanded position relative to the back portion of the vehicle.

2. The apparatus of claim 1, wherein the extender comprises:
   a first arm connected to a second arm; and wherein the first arm is pivotally connected to the slide arm, and wherein the second arm is connected to the airfoil.

3. The apparatus of claim 2, further comprising:
   a ramp arm; and
   a stop connected to a surface of the airfoil.

4. The apparatus of claim 3, wherein the receiving feature comprises a recess disposed between the ramp arm and the stop.

5. The apparatus of claim 4, wherein the first arm is configured to pivotally move the slide arm into the receiving feature.

6. The apparatus of claim 5, wherein, when the slide arm is disposed in the recess, the slide arm is configured to abut the stop and the ramp, thereby preventing movement of the slide arm and preventing pivoting of the first arm when a pivoting force is applied to the first arm.

7. The apparatus of claim 5, wherein the airfoil is configured such that applying a force on the airfoil in a direction substantially perpendicular to the back portion of the vehicle buckles the airfoil, thereby lifting the slide arm from the recess.

8. The apparatus of claim 7, wherein the airfoil is configured such that when the slide arm lifts from the recess the airfoil moves to a retracted position.

9. The apparatus of claim 3, wherein the first arm is configured to pivotally move the slide arm along the ramp arm.

10. The apparatus of claim 2, wherein the first arm includes a biasing element biasing the first arm toward a retracted position.

11. The apparatus of claim 2, wherein the second arm is configured to pivotally extend the airfoil in a direction away from the back portion of the vehicle.

12. The apparatus of claim 2, wherein the first arm is configured to pivotally provide the airfoil with an arcuate cross-sectional shape in the expanded position.

13. The apparatus of claim 2, further comprising:
   a support arm connected to the first arm and the slide arm.

14. The apparatus of claim 1, wherein when the slide arm is disposed in the recess portion of the airfoil, the airfoil has an arcuate cross-sectional shape.

15. The apparatus of claim 1, wherein the at least one extender includes a plurality of extenders, and wherein each of the plurality of extenders is connected to the slide arm.

16. The apparatus of claim 15, further comprising:
   a stabilizing arm, wherein each of the plurality of extenders is connected to the stabilizing arm.

17. The apparatus of claim 1, further comprising:
   a securing feature configured to secure the airfoil against the back portion of the vehicle.

18. The apparatus of claim 17, wherein the securing feature comprises a latch mateable with a groove formed in the airfoil.

19. The apparatus of claim 1, wherein the air foil comprises a plurality of segments.

20. The apparatus of claim 19, wherein the plurality of segments are pivotally connected to one other via hinges.

21. The apparatus of claim 1, wherein the at least one extender is attached to the back of the vehicle via a bracket.

* * * * *